United States Patent [19]

Gettert et al.

[11] 4,113,445
[45] Sep. 12, 1978

[54] PROCESS FOR THE PARTIAL OXIDATION OF LIQUID HYDROCARBONACEOUS FUELS

[75] Inventors: Hans Gettert, Mannheim; Arnulf Jeck, Neustadt; Dietmar Werner, Weisenheim, all of Fed. Rep. of Germany

[73] Assignee: Texaco Development Corporation, New York, N.Y.

[21] Appl. No.: 861,744

[22] Filed: Dec. 19, 1977

[30] Foreign Application Priority Data

Jan. 31, 1977 [DE] Fed. Rep. of Germany ....... 2703921

[51] Int. Cl.$^2$ .............................................. C10J 1/00
[52] U.S. Cl. .................................... 48/197 R; 48/200; 48/215; 252/373; 431/6
[58] Field of Search .................... 48/197 R, 200, 201, 48/202, 203, 212, 215, 210; 252/373; 431/6, 8

[56] References Cited

U.S. PATENT DOCUMENTS

| 3,545,926 | 12/1970 | Schlinger et al. ........................ 48/215 |
| 3,607,157 | 9/1971 | Schlinger et al. ................. 48/197 R |
| 3,715,301 | 2/1973 | Tassoney et al. .................. 48/197 R |
| 4,007,017 | 2/1977 | Slater et al. ......................... 48/197 R |

*Primary Examiner*—Richard V. Fisher
*Assistant Examiner*—George C. Yeung

*Attorney, Agent, or Firm*—Thomas H. Whaley; Carl G. Ries; Albert Brent

[57] ABSTRACT

The reaction zone of a free-flow refractory lined partial oxidation gas generator is preheated by the complete combustion of fuel gas, supplied by means of a preheat burner, with air at atmospheric pressure. The preheat burner is replaced by the main process burner and the heating is continued by the complete combustion of said fuel gas and air at atmospheric pressure. The main burner is then made pressure tight to the reaction zone, and the heating is continued. When the temperature of the reaction zone reaches the temperature for ignition of the autothermal partial oxidation reaction of the liquid hydrocarbonaceous fuel and free-oxygen containing gas in the presence of a temperature moderator, fuel gas and air are cut-off, and are respectively replaced by a stream of said liquid hydrocarbonaceous fuel, optionally in admixture with a temperature moderator, and a separate stream of free-oxygen containing gas, optionally in admixture with a temperature moderator. After ignition, the partial oxidation reaction takes place in the reaction zone, and the gas generator is brought up to operating pressure. In the event of temporary shut down of the gas generator, the streams of liquid hydrocarbonaceous fuel, steam, and free-oxygen containing gas are shut-off and a stand by temperature may be maintained in the reaction zone to allow quick start-up by switching the feedstreams to the main burner back to fuel gas and air.

7 Claims, 1 Drawing Figure

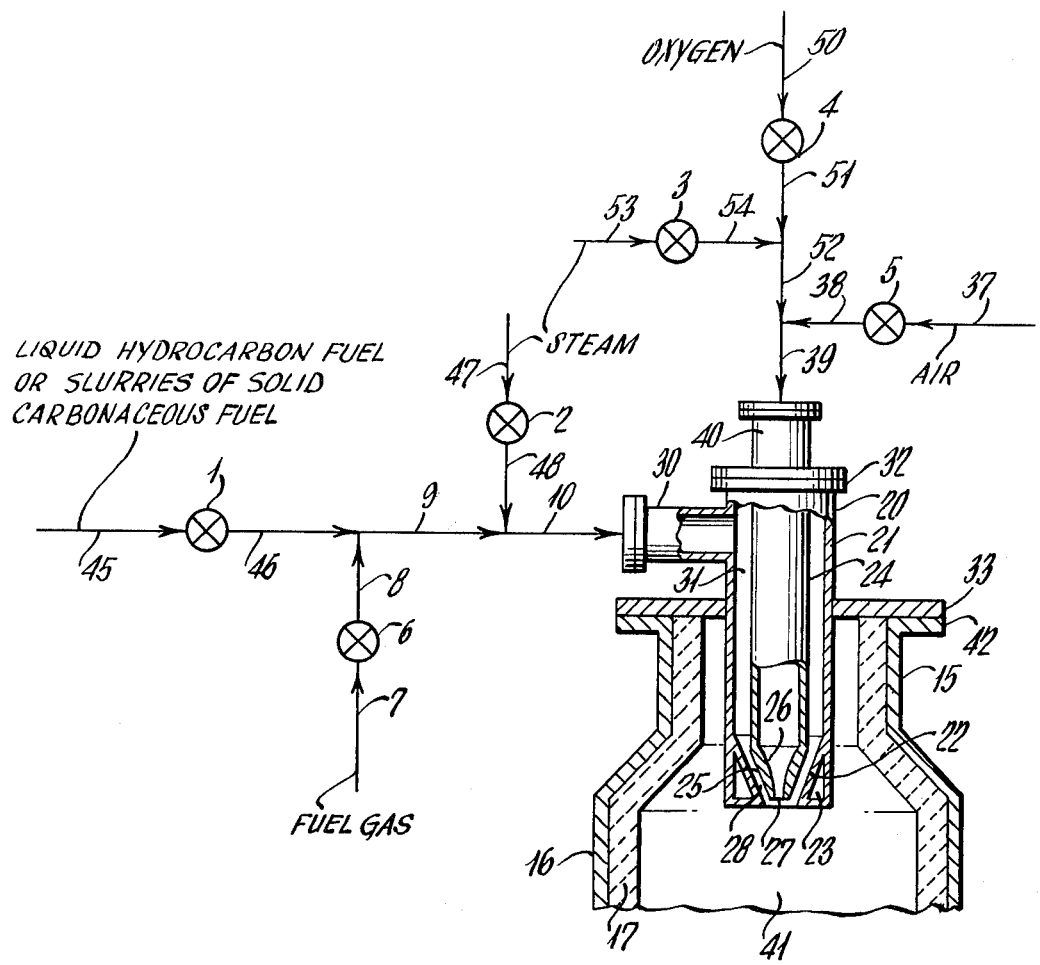

PROCESS FOR THE PARTIAL OXIDATION OF LIQUID HYDROCARBONACEOUS FUELS

BACKGROUND OF THE INVENTION

1. Field of the Invention

This is a partial oxidation process. More particularly it pertains to preheating and starting-up a free-flow refractory lined partial oxidation gas generator for the production of gas streams comprising $H_2$ and CO.

2. Description of the Prior Art

Processes for the partial oxidation of liquid or solid fuels have been disclosed (cf. Ullmann's Encyklopadie der technischen Chemie, 3rd Edition, 1965, Volume 16, under the heading "Synthesegas", pages 589–635, and Supplementary Volume, 3rd Edition, 1970. under the heading "Ammonia", pages 458–480). With regard to the patent literature, reference may in particular be made to the following German Pat. Nos. 1,061,303; 1,080,079; 1,170,379; 1,905,604; and 2,162,253; and to the following coassigned U.S. Pat. Nos. 2,928,460; and 3,874,592.

The above publications show that because of the rather high temperature in the reaction zone and because of the impurities in the starting material (above all, heavy residual oils and solid fuels containing ash-producing constituents, e.g. vanadium, nickel and iron), problems arise specifically in relation to the burner, also to the reactor lining, and to the temperature-measuring instruments located therein. These problems frequency lead to interruptions of the operation. It is true that in recent years it has been possible to improve the life of the burners from initially only a few hours to from 20 to 30 days and then to the currently usual average value of from 60 to 70 days. However, shutting off the gasifier part of the production installation can also be necessitated by faults and corrosion problems in upstream or downstream parts of the installation (e.g. pumps, waste heat boilers, gas scrubbers or shift conversion units) or by a power failure.

Unless such faults are dealt with rapidly (without about 1 hour), the reaction zone cools to the point at which restarting the gas production is not directly feasible.

Restarting after a fault lasting longer than at most 1 hour then entails the following as does the first start-up: To heat (or reheat) the reaction zone, a special "preheat burner" of very simple construction is employed, consisting essentially of a pipe through which a fuel gas passes and which is of such dimensions that with the amounts of fuel gas involved, a stable flame forms at the pipe orifice. The air required for the combustion of the fuel gas reaches this flame from its enviroment, without a special device and without the use of pressure. In general, it is advantageous to reduce the pressure slightly in the reaction zone and thereby draw in the amount of air required, and transport the combustion gases through the reaction zone.

As may be seen from the above, the preheat burner is not firmly fixed to the upper orifice of the reaction zone, through which the main burner is normally introduced, and instead is merely placed over this orifice by means of a simple device. Accordingly, the main process burner must be removed if the reaction zone requires reheating. When the ignition temperature specified for the particular starting material has been exceeded by means of the preheat burner, the latter is removed and the main burner is fixed. During the time it takes for changing burners and fixing the main burner; and during other work required to start the reaction, e.g. the start-up of pumps, the temperature in the reaction zone drops substantially, so that reliable ignition is only possible if the above manipulations can be carried out very rapidly. If there are any delays and if, as a consequence, the temperature falls below a limiting value specified for safety reasons and depending on the nature of the fuel to be gasified, ignition is no longer feasible. Instead, it is necessary in such cases — which are not particularly rare — to remove the main burner again and to reheat the reaction zone with the preheat burner yet again.

SUMMARY

A free-flow refractory lined synthesis gas generator for the partial oxidation of a liquid hydrocarbonaceous fuel is started up by first preheating the reaction zone to a temperature in the range of about 1832° to 2012° F. This is done by placing a simple pipe-like preheat burner in the top inlet of the gas generator. Air from the atmosphere is aspirated into the reaction zone by way of the clearance surrounding the preheat burner. Fuel gas is passed through the preheat burner and is burned in the reaction zone at atmospheric pressure with said air. The products of the complete combustion may be vented to the atmosphere.

After the reaction zone reaches a temperature in the range of about 1832° to 2012° F., the gas and air are shut off and the preheat burner is replaced by an annular-type main burner. Fuel gas is passed through the same passage in the main burner that will later carry the liquid hydrocarbonaceous fuel optionally in admixture with a temperature moderating gas i.e. steam. Simultaneously, air (in excess of stoichiometric) or compressed air is fed through the oxidant passage in the main burner. At this point, the fuel gas and air may be fed to the burner at a pressure in the range of about 0.5 to 1 atmospheres. Heating of the reaction zone at preferably atmospheric pressure is continued by means of the main burner and the complete combustion of the fuel gas with air. The products of the complete combustion may be vented to the atmosphere. The main burner is then connected pressure tight to the reaction zone and complete combustion of the fuel gas may then take place over a pressure range of about 0.5 to 250 atmospheres.

By this means, the reaction zone of the gasifier may be heated to the temperature required for ignition of the autothermal partial oxidation reaction of the liquid hydrocarbonaceous fuel and free oxygen containing gas in the presence of a temperature moderator, say about 2192° to 2642° F. The reaction zone may be maintained at that stand by temperature until it is time to start production of synthesis gas. At such time the fuel gas and air feed streams to the main burner are turned off and replaced respectively with said stream of liquid hydrocarbonaceous fuel optionally in admixture with a temperature moderator, and a separate stream of free-oxygen containing gas optionally in admixture with a temperature moderator. The hydrocarbonaceous fuel flows through the passage in the burner formerly occupied by the fuel gas; and, the free-oxygen containing gas flows through the passage in the burner formerly occupied by the air. The atomic ratio of free oxygen to carbon in the fuel (O/C ratio) is in the range of about 0.6 to 1.6. When steam is used, as the temperature moderator, the steam to fuel weight ratio is in the range of about 0.1 to 5. After ignition of the reactants at atmospheric pressure, the pressure of the reaction zone is brought up to the desired operating pressure in the range of about 1 to 250 atmospheres. The temperature of the partial oxidation reaction may range from about 1800° to 3000° F.

In the event of temporary shut down of the gas generator, the streams of liquid hydrocarbonaceous fuel, steam, and free-oxygen containing gas are shut-off and a stand by temperature may be maintained in the reaction zone to allow quick start-up by switching the feedstreams to the main burner back to fuel gas and air.

BRIEF DESCRIPTION OF THE DRAWING

The invention will be further understood by reference to the accompanying drawing. The drawing includes a schematic representation of a suitable single-annulus type burner for use in the preheat or stand by stages.

DESCRIPTION OF THE INVENTION

It is an object of the invention to improve the start-up of installations for partial oxidation — in particular after interruptions in production — and so as to make it possible to have an effective reserve of gas generators, either for gas production or power generation, or for dealing with periodically occurring peak demand. We have found that this object of simplified start-up of an installation for partial oxidation is achieved by running the main process burner immediately after the reaction zone has been heated by means of a preheat burner; or the reaction zone is in the stand by stage and is still hot, or immediately after letting-down the closed-down installation. In such case fuel gas and air or compressed air are passed through the main burner, thus keeping the reaction zone warm or reheating the reaction zone.

Only thereafter is the main burner fixed pressure-tight, unless this has already been done as a result of the preceding production period. Thereafter, all other manipulations required for starting-up, or restarting, the installation (for example the start-up of pumps and the like) are carried out without the need for urgency, the requisite ignition temperature (for example 2,192° to 2,642° F.) being maintained constantly in the reaction zone.

When all the preparations for the start-up or restart have been made, the supply of gas and air to the main burner is cut and the reactants (liquid and/or slurries of solid fuels, steam and oxygen) are ignited.

It had been disclosed that fuel gas can be safely reacted with an amount of air or oxygen inadequate for combustion, by autothermal cracking. However, it was surprising that a mixture of fuel gas with an amount of air sufficient for complete combustion can be reacted safely, without the danger of an explosion, in a closed system at low gas velocities. This is all the more true since under the same conditions in an open system, supplying the appropriate amounts of gas and air to the operating burner does not allow a stable flame to be obtained, and instead the flame constantly breaks.

The gas generator comprises a vertical cylindrically shaped steel pressure vessel lined with refractory, such as shown in coassigned U.S. Pat. No. 2,809,104. A typical quench drum for cooling the hot effluent stream of gas from the reaction zone to a temperature in the range of about 400° to 900° F. by direct contact with water is also shown in said patent. At least a portion of the entrained solids i.e. particulate carbon, ash, are removed from the process gas stream by the turbulent quench water and a pumpable dispersion of particulate carbon and water containing about 0.5 to 4.0 wt. % carbon is produced in the quench tank. Any remaining entrained solids may be removed from the process gas stream by additional scrubbing with water. An annulus-type burner, such as shown in coassigned U.S. Pat. No. 2,928,460, may be used to introduce the feed streams into the reaction zone.

The composition of the raw gas stream leaving the gas generator is about as follows, in mole percent: $H_2$ 60 to 29, CO 20 to 57, $CO_2$ nil to 5, $H_2O$ nil to 20, $CH_4$ nil to 25, $H_2S$ nil to 2, COS nil to 0.1, $NH_3$ nil to 5, $N_2$ nil to 20, and Ar nil to 0.5. Particulate carbon is present in the range of about 0.5 to 20 weight % (basis carbon content in the original feed). Ash may be present in the amount of about nil to 60 weight % of the original hydrocarbonaceous feed. Depending on the composition, the gas stream may be employed as synthesis gas, reducing gas, or fuel gas.

The present invention accordingly relates to a process for carrying out the partial oxidation of liquid hydrocarbon fuels and/or slurries of solid carbonaceous fuels by reaction with a free-oxygen containing gas in the presence of steam or of other temperature moderators under atmospheric or superatmospheric pressure and at elevated temperatures, to give a gas mixture comprising $H_2$ and CO. In one embodiment of the process the heating-up of the reaction zone is first carried out under atmospheric pressure, using a preheat burner which is not connected firmly and in an air-tight manner to the reaction zone, and which is operated solely with a fuel gas which is completely combusted with air. After which, the preheat burner is replaced by the main burner. The main burner is first supplied with the fuel gas and air and the heating up of the reaction zone is continued by complete combustion until the temperature of the reaction zone reaches the temperature for ignition of the autothermal partial oxidation reaction of the liquid hydrocarbonaceous fuel and free-oxygen containing gas in the presence of a temperature moderator. The main burner is then firmly connected to the reaction zone. The starting materials required for the partial oxidation reaction are then introduced through the same passages of the main burner and ignited under atmospheric pressure. Only thereafter is the reaction zone placed under pressure.

The process is characterized in that before or, under certain circumstances, even after the main burner has been firmly connected to the reaction zone, the latter, whilst under atmospheric pressure, is heated to the temperature required for safe ignition of the autothermal reaction, or is kept at such a temperature, by supplying fuel gas and air through the connection lines of the main burner.

The term liquid hydrocarbonacous fuel as used herein to describe various suitable feedstocks is intended to include liquid hydrocarbons, slurries of solid hydrocarbons and carbonaceous material, and mixtures thereof. In fact, substantially any combustible carbon-containing organic material, or slurries thereof, may be included within the definition of the term "hydrocarbonaceous." For example, there are (1) pumpable slurries of solid carbonaceous fuels, such as coal, particulate carbon, petroleum coke, and mixtures thereof, in a vaporizable liquid carrier, such as water, liquid hydrocarbon fuel, and mixtures thereof.

The term liquid hydrocarbon, as used herein to describe suitable liquid feedstocks, is intended to include various materials, such as liquefied petroleum gas, petroleum distillates and residua, gasoline, naphtha, kerosine crude petroleum, asphalt, gas oil, residual oil, tar-sand oil and shale oil, coal-derived oil, aromatic hydrocarbons (such as benzene, toluene, zylene fractions), coal tar, cycle gas oil from fluid-catalytic-cracking operations, furfural extract of coker gas oil, and mixtures thereof.

Also included within the definition of the term hydrocarbonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

The liquid hydrocarbonaceous feed may be at room temperature, or it may be preheated to a temperature up to a high as about 600° to 1200° F. but preferably below its cracking temperature. The liquid hydrocarbonaceous feed may be introduced into the gas-generator burner optionally in admixture with a temperature moderator. For example the liquid hydrocarbonaceous fuel may be introduced in liquid phase or in a vaporized mixture with the temperature moderator.

The need for a temperature moderator to control the temperature in the reaction zone depends in general on the carbon-to-hydrogen ratios of the feedstock and the oxygen content of the oxidant stream. One is used with liquid hydrocarbon fuels and with substantially pure oxygen. The temperature moderator may be introduced in admixture with either or both reactant streams. Water in liquid phase or steam is the preferred temperature moderator. Other temperature moderators include: $CO_2$, $N_2$, and a cooled portion of the effluent gas stream from the gas generator.

The term free-oxygen gas as used herein means air, oxygen-enriched-air i.e. greater than 21 mole % $O_2$, and substantially pure oxygen, i.e. greater than about 95 mole % oxygen (the remainder usually comprising $N_2$ and rare gases). Free-oxygen containing gas may be introduced by way of the partial-oxidation burner at a temperature in the range of about ambient to 1800° F.

All of the raw gas exiting from the reaction zone of the gas generator may be cooled and scrubbed with water by being directly introduced into a quench tank.

Alternatively, the hot effluent gas stream leaving the gas generator may be cooled to a temperature in the range of about 350° F. to 750° F. but above the dew point of water by indirect heat exchange with water in a gas cooler, such as shown and described in coassigned U.S. Pat. No. 3,920,717. The cooled process gas stream is then cleaned by scrubbing with water in a conventional gas scrubbing zone. For example, the gas scrubber as shown in the drawing, or the venturi or jet scrubber as shown in Perry's Chemical Engineer's Handbook, Fifth Edition, McGraw-Hill Book Company 1973, FIG. 20-120 and FIG. 20-121.

The term fuel gas as used herein to describe suitable gaseous fuels which may be fed to the preheat burner, include methane, ethane, propane, butane, pentane, natural gas, water-gas, coke-oven gas, refinery gas, acetylene tail gas, ethylene off-gas, synthesis gas as produced by the subject process, and mixtures thereof. Preferably, any fuel gas which has an upper calorific value of not less than 1,500 kcal/cubic meter (S.T.P.) may be used.

The autothermal cracking of the fuel gas may be carried out at pressures of about up to 250 atmospheres, say 1 to 250 atmospheres. As a rule, pressures of from 10 to 100 atmospheres, especially from 25 to 85 atmospheres, are used. During the stage according to the invention, of heating up or start-up, restarting or maintaining ready-to-operate conditions, it is advantageous to employ a pressure of less than 25 atmospheres.

The pressure to be used depends, inter alia, on the pressure under which the fuel gas and compressed air are available. Where the air for the burner is to be drawn in by means of a suction-generating auxiliary unit, pressures of around atmospheric pressure or slightly below are employed. This also applies if, or as long as, the main burner has not yet been firmly fixed to the reaction zone.

After removing the preheat burner which has been loosely mounted on the reaction zone, the main burner is next placed in position in place of the preheat burner (flange on flange) and is fixed temporarily, for example with three bolts. Fuel gas in an amount of from 50 to 500 cubic meters (S.T.P.)/h (the amount depending on the calorific value) is then immediately introduced into the reaction zone through a multiple safety valve system, advantageously via the line which in normal operation supplies the fuel of the operating burner. The steam feed of course remains shut. An amount of air in excess of the stoichiometric amount (based on the fuel gas) is introduced via the line provided in normal operation for the introduction of the oxidizing agent (oxygen or air) and via a multiple safety valve system. Only when the heating has been set going in this way, is the main burner connected pressure-tight to the reaction zone, i.e. all the bolts intended for the flange coupling are fitted and tightened. The other manipulations required for starting up, such as starting the pumps and making downstream parts of the installation ready for operation, can then be carried out without the urgency required in conventional operation.

When this work has been carried out and the desired ignition temperature has been reached, the fuel gas feed and air feed are shut off and the generator is ignited by introducing the envisaged amounts of liquid fuel and/or slurries of solid fuel, steam and free-oxygen containing gas. The steam may be in admixture with the free-oxygen containing gas, the hydrocarbonaceous fuel, or both. After ignition at atmospheric pressure, the pressure in the reaction zone is raised to the operating pressure.

When the installation is being started up from cold, which includes starting up after a shut-down necessitated by faults in the gasifier system, it is first heated up with the preheat burner. However, in the process of the invention it need only be heated to from about 1,832° to 2,012° F. Fuel gas is used for preheating; the air required for complete combustion of the fuel gas is preferably drawn in from the environment, by suction. The products of the complete combustion may be vented to the atmosphere.

After a temperature of from about 1,832° to 2,012° F. has been reached, the preheat burner is replaced by the main burner, and this burner is then used for further heating-up of the reaction zone, or for maintaining the temperature of the reaction zone, in the manner described above. If a break in operation does not cause the temperature to fall below about 1,652° F., reheating can be effected without removing the main burner, by, in fact, using the latter.

By way of supplement, the following special advantages can be claimed for the process according to the invention:

1. In the event of operating faults which require shutting down the reaction furnace (or cause it to shut down automatically), it is possible, after letting down the reaction zone, to maintain the temperature, which in the meantime has only fallen slightly, at the level required for restarting, throughout the entire duration of the interruption, by means of the main burner, or to return it to the level required for restarting, by means of the main burner.

Fitting and removing the operating burner, and reheating with a preheat burner, is not necessary. Accordingly, time and labor is saved.

1. As a result of the measure described under 1., cooling of the reaction zone is substantially avoided. This results in the refractory lining and the temperature-measuring instruments being subjected to less severe conditions, and hence having a substantially increased life.

3. If a reserve gasifier unit is available, it can be employed very quickly (within from 10 to 15 minutes) for additional production, if it is constantly kept at the operating temperature by means of the measures provided by the invention. This advantage can be particularly important for dealing with sudden peak demands, for example in power stations.

4. Surprisingly, the life of the burner is also increased if the burner is kept constantly under conditions resembling normal operation. In several cases, lives of more than 500 days were achievable.

5. It was also unexpected that when using the process according to the invention in connection with gas-producing installations with waste heat boilers, in which a liquid salg is produced in the lower part of the reaction furnace, a further advantage is achieved in respect of the consistency of this slag.

The slag produced from the fuels is normally found to have caked, after the reaction furnace has cooled, to give a solid mass which can only be removed by laborious mechanical means or by remelting; in the process according to the invention, this slag is obtained as a loose pourable grit, provided intermediate cooling has been avoided during the operating period of the reaction furnace and provided the reaction furnace has transiently been set, once or several times, to operating conditions which merely serve to keep the furnace hot. The loose, pourable ash grit is very much simpler to remove; this removal does not even necessitate substantial cooling of the reaction furnace.

DESCRIPTION OF THE DRAWING

A more complete understanding of the invention may be had by reference to the accompanying schematic drawing. The drawing will be used first to describe an embodiment in which a gas generator is started up, and second to describe the embodiment for maintaining a stand by temperature to permit quick start-up after a temporary shut-down of the gasifier.

With valves 1 to 5 closed and 6 open, fuel gas is passed through lines 7 to 10 into a conventional simple pipe-type preheat burner (not shown) which is supported in upper flanged inlet 15 of free-flow synthesis gas generator 16. Gas generator 16 is a vertical steel pressure vessel with a refractory lining 17. Air from the surrounding atmosphere is aspirated through the gas generator. Since flange plate 33 is not used with a preheat pipe-type burner, the air enters through the space in inlet 15 that surrounds the preheat burner. The fuel gas is ignited and the reaction zone is heated at atmospheric pressure by complete combustion of the fuel gas with air. When the desired temperature is reached, say about 1832° to 2012° F., fuel gas valve 6 is closed, the steam injector (not shown) which sucks in the combustion air for the preheat burner is shut down, and the preheat burner is removed from the gas generator and replaced by annulus-type main burner 20.

Main burner 20 is positioned in upper inlet 15 along the vertical axis of gas generator 16. Main burner 20 comprises. Outer conduit 21 which terminates in downstream converging nozzle 22 that is encircled by water cooling chamber 23; inner conduit 24 that terminates in downstream converging nozzle 25 having a converging long radius 26 and circular tip orifice 27; annular passage 28 between the inside surface of nozzle 22 and the outside surface of nozzle 25; and flanged side inlet 30 connected to annular passage 31 formed from the inside surface of outer conduit 21 and the inside surface of inner conduit 24. Further, annular passage 31 is closed upstream by annular plate 32 and connects downstream with annular passage 28. Main burner 20 is positioned in inlet 15 by means of flange plate 33. At first plate 33 is not bolted pressure-tight to the reaction zone in order to permit operation at atmospheric pressure.

With valves 1 to 4 and 6 closed, air or compressed air in line 37 is passed through valve 5, lines 38-39, and flanged inlet 40 of inner conduit 24. Fuel gas in line 7 is passed through valve 6, lines 8-10, side inlet 30, and annular passages 31 and 28. The fuel gas mixes with the air from orifice 27 and is completely combusted in the reaction zone 41 of the gas generator.

Soon after combustion of the fuel gas gets going, the main burner is fixed pressure tight to the reaction zone by bolting together flanges 33 and 42. The heating of reaction zone 41 with fuel gas and air is continued until the temperature in the reaction zone reaches the temperature required for ignition of the autothermal partial oxidation reaction of the hydrocarbonaceous fuel, steam and oxygen, say about 2192° to 2642° F.

The reaction zone is held at said stand by temperature until it is time to commence production of synthesis gas. At said time, fuel gas valve 6 and air valve 5 are shut off. Liquid hydrocarbon fuel or slurries of solid carbonaceous fuel in line 45 is passed through open valve 1, lines 46, 9, and mixed in line 10 with a portion of the steam from line 47, open valve 2, and line 48. The mixture of hydrocarbonaceous fuel and steam in line 10 is passed through inlet 30, and annular passages 31 and 28. A stream of substantially pure oxygen enters through line 50, open valve 4, line 51, and optionally may be mixed in line 52 with a minor portion of the steam from line 53, open valve 3, and line 54. The mixture of oxygen and any steam in line 39 is passed through central conduit 40, nozzle 25, orifice 27, and mixes with the mixture of hydrocarbonaceous fuel and steam from annular passage 28. The reactants are ignited and the partial oxidation reaction takes place in reaction zone 41. After ignition, the pressure in the reaction zone is raised to the operating pressure.

If a break in operation occurs which does not cause the temperature in the reaction zone to fall below 1652° F., then the reaction zone may be reheated to a stand by temperature in the range of about 2192" to 2642° F. without removing the main burner 20. In such case, valves 1 to 4 are closed. Air valve 5 is opened and air is introduced to burner 20 by way of lines 37-39 as previously described. Similarly, fuel gas valve 6 is opened and fuel gas in line 7 is passed into main burner 20 by way of lines 7–10, as previously described. Complete combustion of the fuel gas with air takes place in reaction zone 41 to maintain said stand by temperature.

The process of the invention has been described generally with reference to materials of particular compositions for purposes of clarity and illustration only. It will be apparent to those skilled in the art from the foregoing that various modifications of the process and materials disclosed herein can be made without departure from the spirit of the invention.

We claim:

1. In a partial oxidation process for producing gaseous mixtures comprising $H_2$ and CO, and at least one material from the group $H_2O$, $CO_2$, $H_2S$, COS, $CH_4$, $N_2$, $NH_3$, and Ar, and entrained particulate carbon by the partial oxidation of a liquid hydrocarbonaceous fuel with a free-oxygen containing gas optionally with a temperature moderator in a free-flow, noncatalytic refractory lined, gas generator at a temperature in the range of about 1800° to 3000° F. and a pressure in the range of about 1 to 250 atmospheres, including preheating the reaction zone of said gas generator at atmospheric pressure by introducing fuel gas into said reaction zone by means of a preheat burner and by the complete combustion of said fuel gas with air, stopping said flow of said fuel gas and air and removing said preheat burner from the gas generator, replacing said preheat burner with an annulus-type main burner, the improvement comprising removing said preheat burner from the gas generator when said reaction zone reaches a temperature in the range of about 1832° to 2012° F.; introducing air or compressed air in excess of stoichiometric into said reaction zone by way of one passage of said main burner and continuously passing fuel gas through another passage of said main burner, heating said reaction zone by complete combustion of said fuel gas and air at a pressure in the range of about 0.5 to 1.0 atmospheres, connecting said main burner pressure tight to said reaction zone and continuing heating said reaction zone at a pressure in the range of about 0.5 to 250 atmospheres until the temperature required for ignition of the autothermal partial oxidation reaction of the liquid hydrocarbonaceous fuel and free oxygen containing gas in the presence of a temperature moderator in the range of about 2192° to 2642° F. is reached; stopping the flow of said streams of fuel gas and air and passing a stream of liquid hydrocarbonaceous fuel optionally in admixture with a temperature moderator through the same passage in said main burner that formerly carried said fuel gas, and passing a stream of free-oxygen containing gas optionally in admixture with a temperature moderator through the same passage in said main burner that formerly carried said air; and mixing said streams together to form a mixture, and igniting said mixture at atmospheric pressure and bringing said reaction zone up to operating pressure to produce said gaseous mixtures.

2. The process of claim 1 further provided with the step of maintaining a stand by temperature in said reaction zone if a break in operation does not cause the temperature to fall below about 1652° F. by stopping the flow of said streams of liquid hydrocarbonaceous fuel and said free-oxygen containing gas to said main burner, passing a stream of fuel gas through the same passage in said main burner that formerly carried said liquid hydrocarbonaceous fuel optionally in admixture with a temperature moderator, passing a stream of air optionally in admixture with a temperature moderator through the same passage in said main burner that formerly carried said free-oxygen containing gas, mixing said reactants, igniting said mixture, and heating said reaction zone by complete combustion of said fuel gas to maintain said stand by temperature in the range of about 1832° to 2012° F.

3. The process of claim 1 in which said liquid hydrocarbonaceous feedstock is selected from the group consisting of liquified petroleum gas, pertroleum distillates and residua, naphtha, kerosine, gas oil, residual oil, crude petroleum, asphalt, coal tar, coal-derived oil, shale oil, aromatic hydrocarbons, cycle gas oil from fluid-catalytic cracking operations, furfural extract of coker gas oil, tarsand oil and mixtures thereof.

4. The process of claim 1 wherein said liquid hydrocarbonaceous fuel is a slurry of a solid carbonaceous fuel selected from the group coal, petroleum coke, and particulate carbon, and mixtures thereof in a vaporizable liquid carrier selected from the group water, liquid hydrocarbon, and mixtures thereof.

5. The process of claim 1 wherein said liquid hydrocarbonaceous fuel is an oxygenated hydrocarbonaceous organic material selected from the group carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

6. The process of claim 1 wherein said free-oxygen containing gas is selected from the group air, oxygen-enriched air, i.e. greater than 21 mole % $O_2$, and substantially pure oxygen, i.e. greater than about 95 mole % oxygen.

7. The process of claim 1 wherein said temperature moderator is selected from the group water, steam, $CO_2$-rich gas, $N_2$-rich gas, and cooled effluent gas from the gas generator.

* * * * *